June 30, 1959 J. H. HAM, JR 2,893,001

SIGNALING DEVICE

Filed Nov. 15, 1957

INVENTOR
J. H. HAM, JR.

BY Walter M. Hill
ATTORNEY 2,893,001

SIGNALING DEVICE

James H. Ham, Jr., Indianapolis, Ind., assignor to Bell Telephone Laboratories, Incorporated, New York, N.Y., a corporation of New York Application November 15, 1957, Serial No. 696,731

2 Claims. (Cl. 340—392)

This invention relates to audible signaling devices of the percussion type, and more particularly to means for reducing the audible signal frequency of telephone ringers.

The audible signaling device commonly used at telephone subscribers' stations is known as a telephone ringer. This device generally comprises an electromagnetically-controlled, vibratable clapper rod which supports a clapper between a pair of spaced gongs so that as the rod is vibrated the clapper strikes the gongs alternately to produce a sound signal. With the standard strike frequency of twenty per second, the sound signal so produced is sharp and continuous for the duration of current application to the electromagnet.

Attempts have been made heretofore to provide the telephone subscriber with a ringer, the sound output of which is modified or otherwise altered to satisfy the desires of the subscriber. For example, efforts in this direction have resulted in signaling devices in which the sound level is adjustable between upper and lower limits. Alternatively, equally desirable effects can be achieved by reducing the strike frequency to the order of one or two strikes per second to thereby produce a chime type signal.

It is an object of this invention to produce a chime type signal in response to the usual ringing current associated with telephone lines.

It is a further object of this invention to obtain a predetermined reduction ratio between the frequency of the armature movement of a standard type telephone ringer and the frequency of the audible signal produced.

These objects are attained in accordance with the present invention by converting the vibratory motion of the armature of a standard type telephone ringer into a unidirectional, stepped rotation of a shaft. A cam on the shaft deflects and then releases a spring member carrying the clapper ball. The energy of the strike is that stored in said spring member by the action of the cam. The number of armature vibrations required to step the cam from one release point to the next determines the reduction in the strike frequency.

The advantages and features of the invention will become more apparent from the following detailed description which, together with the accompanying drawing, discloses a preferred embodiment.

Figure 1:
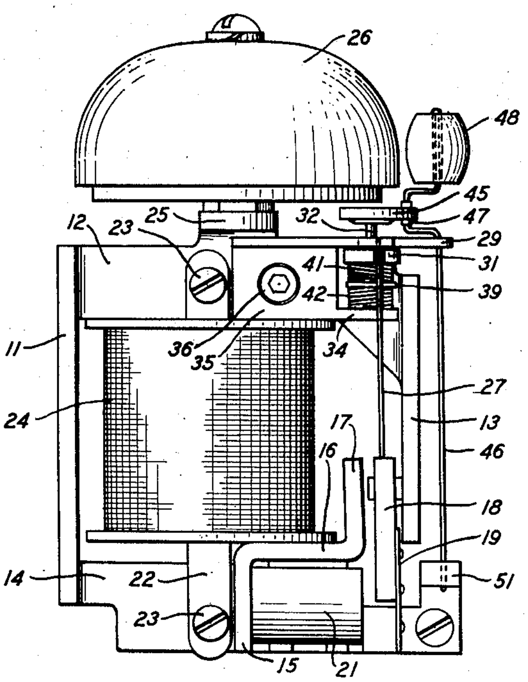
Fig. 1 is a plan view of the telephone ringer of the present invention.

The electromagnetic circuit of the ringer disclosed in Fig. 1 has been chosen merely for purposes of illustration, it being understood that the present invention is applicable to ringers in general and regardless of their electromagnetic design. The electromagnetic circuit disclosed is substantially the same as that illustrated in Patent No. 2,590,500, issued March 25, 1952 to H. A. Bredehoft and M. S. Richardson. It comprises a unitary iron structure having four substantially right-angularly disposed legs 11, 12, 13 and 14, the last of which is provided with an integrally formed section consisting of the right-angularly disposed integral elements 15, 16 and 17. The element 17 is located in spaced relation to the unattached end of leg 13 and effects an air-gap therewith.

Within the air-gap effected by the element 17 and leg 13 an armature 18 is adapted to vibrate, being supported on the iron frame structure by means of the reed-type hinge 19.

A cylindrical permanent magnet 21 is mounted in any suitable manner on the ringer structure so that one end thereof abuts the surface of element 15 and the other end is located in spaced relation to the supported end of armature 18.

A core 22 preferably consisting of a plurality of laminations bridges the legs 12 and 14 and is secured thereto by screws 23. The core 22 parallels the leg 11 and supports a coil 24 in any well-known manner.

A gong support 25 comprising an integral extension of the iron portion of the magnetic circuit of the ringer extends at right angles from the leg 12. Carried by the support 25 and fixed thereto in any suitable manner is a single gong 26. While a single gong is shown, and for purposes of the present invention this may be somewhat more desirable, it should be understood that the invention is not limited thereto. For example, the features of this invention can be adapted to the two-gong arrangement of the above-identified patent.

Figure 2:
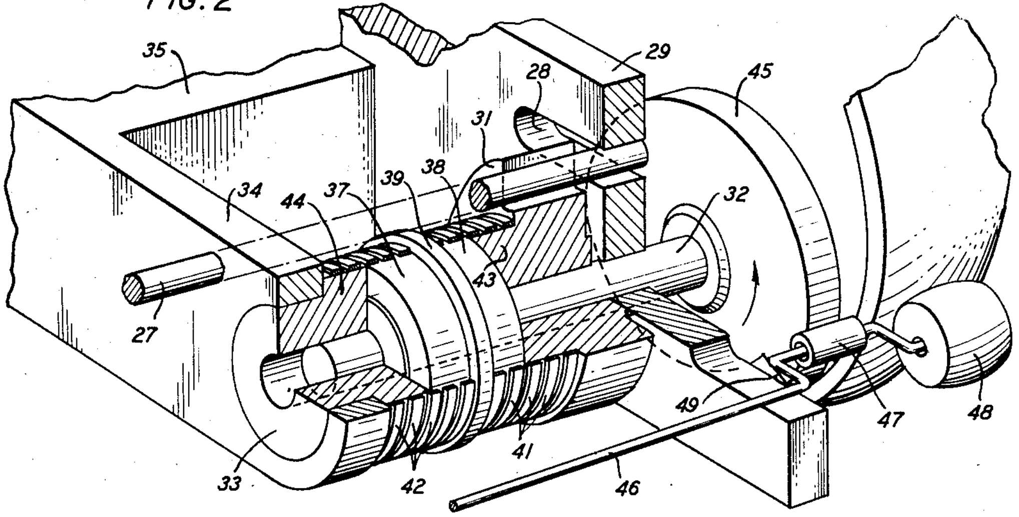
Fig. 2 is an enlarged perspective view, partly in section, of the essential elements of the invention.

Considering now Fig. 2 along with Fig. 1, a relatively stiff rod 27 is mounted at one end to the free end of armature 18, while the other end thereof is slidably supported in a cut away portion 28 of support arm 29. The rod 27 serves to transmit the vibratory motion of the armature to a yoke 31 which is rotatably mounted on shaft 32. Shaft 32 is journaled near one end in support arm 29 and at the other end in bearing 33, the latter being fixedly mounted in support arm 34. Both support arms 29 and 34 are integral extensions of a support member 35 which is secured to the leg 12 by a bolt 36.

The shaft 32 is provided with a pair of integral hub members 37 and 38 which are separated by a third hub member 39 of slightly larger diameter. The hub 38 is intercoupled with the hub 43 of yoke 31 by means of a band clutch 41, while a second band clutch 42 intercouples the hub 37 with the flange 44 of bearing 33. It will be noted in Fig. 1 that these band clutches are wound in opposite directions.

The basic theory of band clutches being well known, only their functioning in the present environment shall be considered. The initiation of movement of yoke 31 in one direction causes a slight constriction of the band clutch 41 with the result that it tightly engages the hub members 38 and 43 thereby causing the hub 38 to move or rotate with the yoke. In the opposite direction of movement of yoke 31 the band clutch 41 releases or slips, thus preventing any corresponding movement of hub 38. Therefore, as the yoke is vibrated, the hub 38 and shaft 32 are driven in small incremented steps in one rotational direction, the directions of clutch drive and release being determined by the sense in which the band clutch is wound.

Inasmuch as the back torque of a band clutch is not zero with movement in the release or slip direction, it is necessary for purposes of the present invention to preserve the advance displacement of the shaft 32. That is, after the hub 38 and shaft 32 have been driven or advanced in step with yoke 31, it is desirable to hold fast the shaft during the return or reverse movement of the yoke. To this end a second clutch is utilized, namely, band clutch 42. Since this clutch is wound in a sense opposite to the drive clutch 41, when clutch 41 is constricted and driving the shaft 32, the clutch 42 is slipping, and when clutch 41 is slipping, clutch 42 is constricted.

Thus, with clutch 41 driving, the band clutch 42 performs no useful function, but when the movement of the yoke is reversed and clutch 41 begins slipping, the clutch 42 constricts and tightly engages hub 37 and flange 44. And since bearing 33 is fixedly mounted in support arm 34, the hub 37 and shaft 32 are held fast during this reverse movement of the yoke.

A cam 45, having a progressively increasing radius terminating in a sharp cut-away portion 49, is fixedly mounted on shaft 32. The spring member 46 is mounted at one end in post 51 of the iron frame structure and it is biased so as to maintain the follower 47 in contact with the cam surface. A clapper 48 is positioned on the free end of the spring member 46 adjacent the gong 26. Now, upon rotation of the cam in the direction shown, the follower 47 and spring member 46 are gradually deflected outwardly and then rapidly released when the follower reaches the cut-away 49. This then causes the clapper to strike the gong in a sound-producing manner, the energy of the strike being that stored in the spring member by the action of the cam in deflecting the same.

Summarizing the operation of the device of the present invention, energization of the coil 24 results in a vibratory movement of armature 18 which is transmitted to, and causes a corresponding movement of, the yoke 31. This vibratory or oscillatory motion of the yoke about the shaft 32 is transmitted to the shaft by means of the drive clutch 41. Since this clutch drives the shaft for only one direction of movement of the yoke, a unidirectional step-like rotation of the shaft is produced. A second clutch, namely, brake clutch 42, is utilized to prevent the shaft from rotating in the other or opposite direction. The cam 45, being mounted on the shaft, gradually deflects and then rapidly releases the spring member 46, thus causing the clapper 48 to strike the gong 26. The exact number of armature vibrations required to step the cam from one release point to the next determines the reduction in the strike frequency.

Variations in the strike frequency may be obtained by various means, such as, by changing the radius of the driving yoke, the number of lobes on the cam, or the angle of armature motion.

It should be understood that the above-described arrangement is illustrative of the application of the principles of the invention. Numerous other arrangements may be devised by those skilled in the art without departing from the spirit and scope of the invention.

What is claimed is:

1. An audible signaling device comprising an armature, electromagnetic means for vibrating said armature, a shaft, clutch means coupled between said armature and said shaft for converting the vibratory motion of said armature into a unidirectional step-like rotation of said shaft, a gong, a clapper, a spring member for supporting said clapper adjacent said gong, and a cam mounted on said shaft, said cam serving to act upon said spring member to gradually deflect and then rapidly release the same to cause said clapper to strike said gong in a sound-producing manner.

2. An audible signaling device comprising an armature, electromagnetic means for vibrating said armature, a yoke mounted for pivotal movement about a shaft, a rod mounted on said armature for transmitting the vibratory movement thereof to said yoke, a one-way drive clutch coupling said yoke to said shaft, said drive clutch serving to drive the shaft in one direction for a predetermined direction of movement of said armature and releasing for the other direction of armature movement, a brake clutch for preventing said shaft from rotating in a direction opposite to the aforesaid one direction, a gong, a clapper, a spring member for supporting said clapper adjacent said gong, and a cam mounted on said shaft, said cam acting upon said spring member to gradually deflect and then rapidly release the same to cause said clapper to strike said gong in a sound-producing manner.

References Cited in the file of this patent

UNITED STATES PATENTS 2,003,340 Burrows et al. ---------- June 4, 1935

FOREIGN PATENTS 75,451 France ---------------- Mar. 13, 1867